United States Patent [19]

Wyss

[11] Patent Number: 5,054,824
[45] Date of Patent: Oct. 8, 1991

[54] COUPLING FOR PLASTIC PIPE FORMED BY CENTRIFUGAL CASTING

[75] Inventor: Walter Wyss, Kappel, Switzerland

[73] Assignee: Hobas Engineering & Durotec AG, Basel, Switzerland

[21] Appl. No.: 435,713

[22] Filed: Nov. 13, 1989

[30] Foreign Application Priority Data

Oct. 11, 1988 [CH] Switzerland .................. 4169/88

[51] Int. Cl.⁵ ..................................... F16L 21/00
[52] U.S. Cl. ................................ 285/369; 285/110; 285/423
[58] Field of Search .............. 285/369, 110, 423; 138/174

[56] References Cited

U.S. PATENT DOCUMENTS

| | | | |
|---|---|---|---|
| 3,013,820 | 12/1961 | Pouppirt | 285/369 |
| 3,120,967 | 2/1964 | Kazienko | 285/369 |
| 3,507,505 | 4/1970 | Mühlner et al. | 285/110 |
| 3,575,430 | 1/1969 | Alpine | 285/110 |
| 3,637,239 | 1/1972 | Daniel | 285/369 |
| 4,167,953 | 9/1979 | Carlstrom | 138/174 |
| 4,174,125 | 11/1979 | Wyss | 285/369 |
| 4,182,519 | 1/1980 | Wilson | 285/369 |
| 4,288,108 | 7/1981 | Streit | 285/369 |
| 4,660,864 | 4/1987 | Ershig | 285/369 |
| 4,915,422 | 4/1990 | Chacon et al. | 285/110 |

FOREIGN PATENT DOCUMENTS

| | | | |
|---|---|---|---|
| 6511788 | 3/1967 | Netherlands | 285/369 |
| 1080305 | 8/1967 | United Kingdom | 285/369 |

Primary Examiner—Eric K. Nicholson
Attorney, Agent, or Firm—McGlew & Tuttle

[57] ABSTRACT

To produce an integrated coupling on pipes manufactured according to the centrifugal casting process, insert rings made of soft PVC are placed into the end parts of the pipe shell mode. In the recess (5a) of one end part (4a), a coupling sleeve (7) is produced by wrapping on a laminate. A recess (5b) provided with an additional annular groove (5c) is produced by the insert ring in the other pipe end part (4b). A prestressed sealing ring (8) is placed into the groove (5c). Projecting beads (8a, 8b) of the sealing ring (8) are compressed by the coupling sleeve (7) on coupling the pipes. The material of the sealing ring (8) that is now being displaced finds space in annular flutes (8d) provided on the inner side of the sealing ring. This integrated coupling is suitable for nonpressurized pipelines and especially for pipes intended for lining reinforced concrete or concrete pipes.

6 Claims, 2 Drawing Sheets

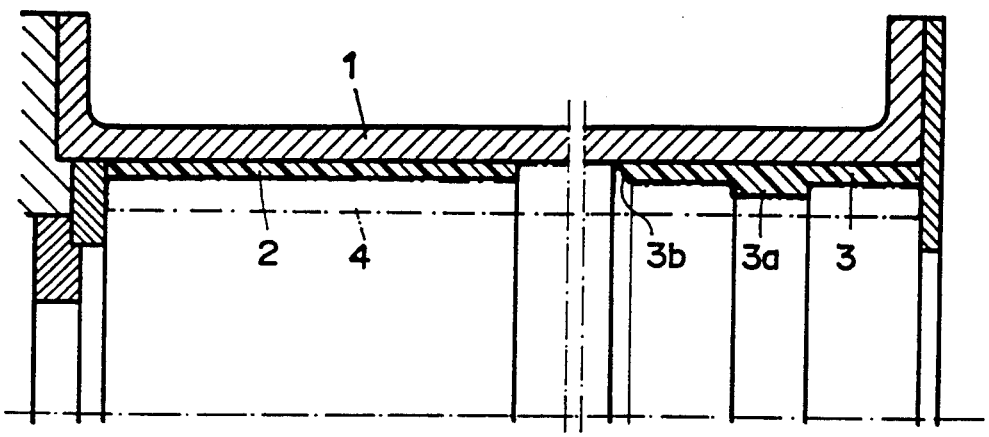
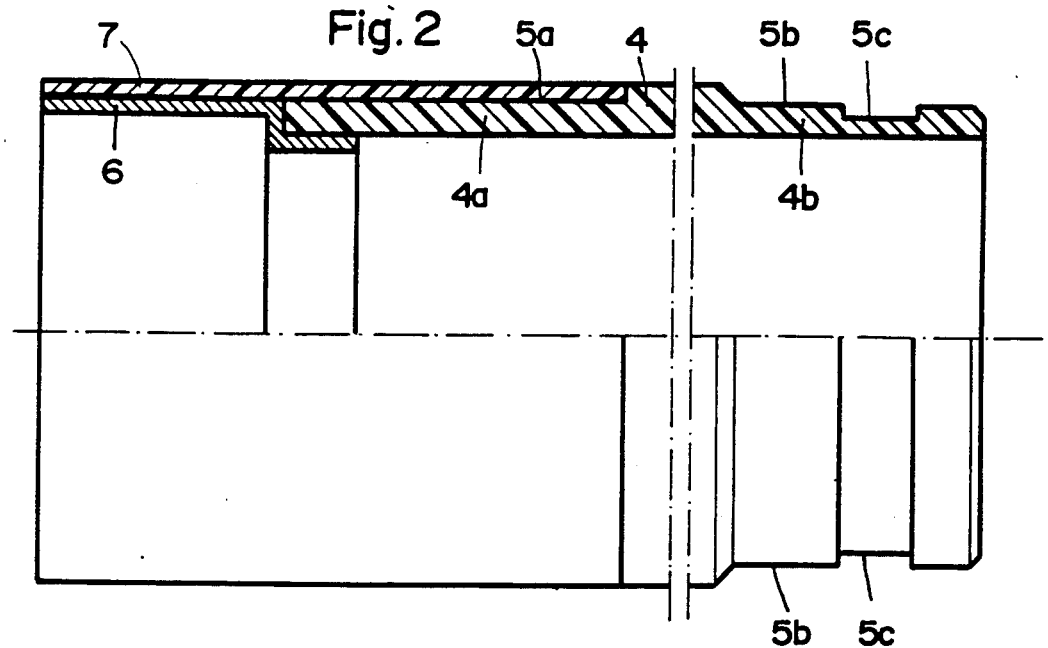
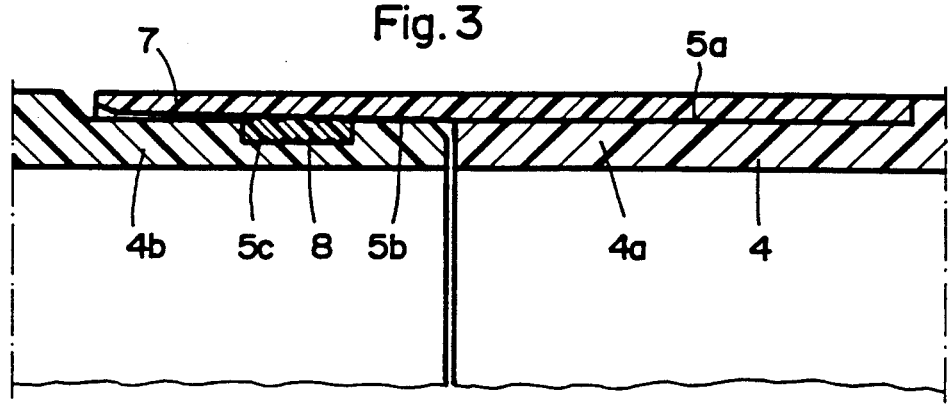

COUPLING FOR PLASTIC PIPE FORMED BY CENTRIFUGAL CASTING

FIELD OF THE INVENTION

The present invention pertains to a coupling for glass fiber-reinforced filler-containing plastic pipes and a process for producing same.

BACKGROUND OF THE INVENTION

Plastic pipes of the above-described type with integrated coupling, i.e., with coupling parts rigidly or integrally attached to the pipe ends, usually must be provided with at least one pipe end part having a recess serving to receive a sealing ring. However, it is particularly advantageous to provide both pipe and parts with recesses. In such an arrangement the recess on one pipe end part has stepped shoulders such that the lower part of the recess acts as a support for the sealing ring and the part of the recess of smaller thickness extends on both sides of the support and is overlapped by the coupling sleeve which extends away from the other pipe end part of the adjacent pipe. The coupling sleeve is fixed in a recess of the other pipe end part. Contrary to the first case, in which the coupling sleeve extends beyond the external diameter of the pipe, the coupling described in the second case has the same external diameter as the coupled pipe. However, it has been common practice hitherto in either case to produce the recesses needed on the pipe end parts by grinding off an external wall layer after completion of the pipe. This is disadvantageous due to the associated amount of labor and the wear of the pipe material, and also the fact that the homogeneous course of the layers of the multilayer pipe wall is thereby interrupted. This is particularly disadvantageous if glass fiber-reinforced layers are also touched or completely removed by the grinding. This happens especially in the case of the relatively deep recess used to receive an ordinary sealing ring.

SUMMARY AND OBJECT OF THE INVENTION

It is an object of the present invention to eliminate the above discussed disadvantages by providing a coupling for a glass fiber reinforced filler containing plastic pipe which requires no grinding of the needed recess, and the layers forming the pipe wall which [layers] are made of various materials or mixtures and can be continued to the pipe end without interruption.

For this purpose, the pipe coupling according to the present invention is characterized in that the pipe is manufactured by centrifugal casting in a rotated mold to provide end parts. At least one of the end parts has a recess produced by an appropriate mold insert ring, and a coupling sleeve is provided extending axially beyond one pipe end part formed as a laminate adhering to the pipe end part, while the recess produced in the other pipe and part is used to receive a sealing ring overlapped by the coupling sleeve of the adjacent pipe in the coupled position.

According to the process to which the present invention also pertains, soft PVC mold insert rings prepared by welding together continuous profiles are used. The inventive process provides that the amount of material filled in during the manufacture of the pipe is reduced in the zone of the insert rings by the wall thickness of the insert rings.

The recess intended to receive the sealing ring preferably has an axial width that is several times, e.g., 5 to 6 times, the radial thickness of the recess. The radial thickness of the end faces of the sealing ring is preferably equal to the depth of the recess. On the inner side of the sealing ring lying on the bottom of the recess, the sealing ring preferably has a plurality of annular grooves, whereas its outer side, which cooperates with the inner side of the coupling sleeve is, has an elevated portion designed as a protruding annular bead or annular lip reaching beyond the recess, with a radial height that is at least double the depth of the recess.

To provide for the coupling sleeve extending beyond one pipe end part, the laminate may be applied directly to the pipe end part corresponding to the external diameter of the pipe. Alternatively, the laminate may be placed into a recess on this pipe end part such that it will be flush with the external diameter of the pipe; in this case, the recess of the other pipe end part receiving the sealing ring is arranged axially within a recess of the pipe end part whose depth corresponds approximately to the radial thickness of the coupling sleeve overlapping it.

Such pipes provided with an integral coupling that has the same outside diameter as the pipe are particularly suitable for use for the subsequent inner lining of wastewater pipes made of concrete, reinforced concrete or asbestos cement pipes, because they are resistant to biogenic sulfuric acid corrosion.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1 is an axial sectional view of the two pipe mold parts with insert rings placed in them for producing the two coupling parts according to a first embodiment of the invention, FIG. 2 is a partial axial sectional view showing the two pipe end parts molded with the insert rings according to FIG. 1, FIG. 3 is an axial sectional view of the coupling formed between two pipes according to the embodiment of FIGS. 1 through 2.

DESCRIPTION OF THE PREFERRED EMBODIMENT

Figure 4:
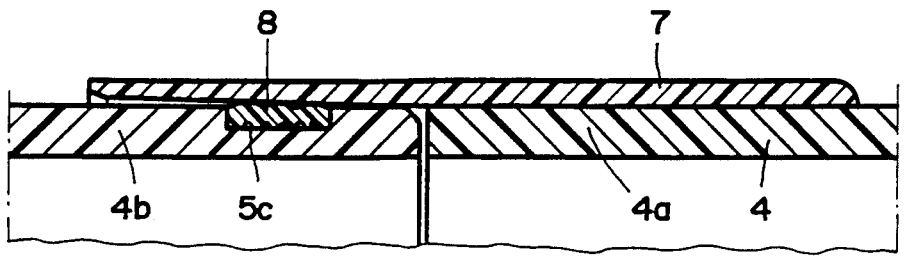
FIG. 4 is an axial sectional view of a second embodiment of the coupling according to the invention.

In FIGS. 1 and 2, the pipe mold used to produce the pipe by centrifugal casting is designated by 1. A cylindrical insert ring 2 made of soft PVC is inserted into one end part of the shell mold. The insert ring 2 is produced from continuous profiles by welding together with 1% overlength in order to achieve tensioning of the ring in shell mold 1. An insert ring 3 produced analogously is placed into the other end part of the pipe 1. The ring 3 has an inner rib 3a, whose axial length is several times its radial height; rib 3a has radial flanks and a cylindrical inner surface. The axially internal end face of the insert ring 3 is conically countersunk. The glass fiber-reinforced, filler-containing plastic pipe 4 (FIG. 3) is produced with the mold containing the insert rings 2, 3 by centrifugal casting. The material is fed into the pipe shell mold 1 in the usual manner, using a feed arm (not shown) performing axial alternating movement in the pipe mold 1. To reach the wall thickness reduction needed on the two pipe end parts 4a, 4b, the material feed arm is switched over sooner in these areas, so that a correspondingly smaller amount of filler material is deposited there; however, layer formation is not interrupted there. Consequently, the plastic pipe 4 thus produced has an external, continuous cylindrical recess 5a on one of the end parts 4a, and an external cylindrical recess 5b which has an annular groove 5c and passes conically over into the external pipe wall on the other pipe end part 4b. The end faces of the pipe 4, manufactured with a certain overlength, are subsequently cut to the desired length in the known manner. A steel mold 6, which is flush with the outer wall of recess 5a, is subsequently placed into the end part 4a of the pipe 4 having the recess 5a. Coupling sleeve 7 is formed by bonding on recess 5a of the pipe end part 4a, which pipe end part 4a is extended by the steel mold 6, by applying a laminate of a mat/fabric composite impregnated with photocuring polyester resin. The pipe provided with integrated coupling parts is now complete.

FIG. 4 shows two such coupled pipes 4, wherein a sealing ring 8 is placed into the pipe end part 4b forming one of the coupling parts, wherein the sealing ring is overlapped by the coupling sleeve 7 on the other pipe end part 4a under compression. Sealing ring 8 provided according to FIG. 4, which is suitable for a nonpressurized pipeline, has the cross sectional shape shown in FIG. 6 in the nonclamped state. The axial width of the groove 5c is somewhat larger than the width of the ring 8, while the internal circumference of the ring is approximately 10% smaller than the circumference of the bottom of the groove, so that the sealing ring 8 can be placed into the groove 5c in an appropriately prestressed state. The radial height of the end faces of the sealing ring corresponds to the depth of the groove 5c. At each end faces one bead 8a is provided, which is elevated by an arc shape and passes over into a likewise arched bead 8b, which still reaches beyond the bead 8a, in the middle part of the sealing ring 8. The inner side of the sealing ring 8, which is in contact with the groove of the bottom with two cylindrical edge surfaces 8a, has a plurality of annular flutes 8d. Thus, sufficient free space is created in the groove 5c to receive the volume of the sealing ring displaced by the pressure applied by the coupling sleeve 7 reaching over the beads 8a, 8b of the sealing ring 8 and to guarantee satisfactory sealing of the pipe coupling. When coupling the pipes, the ring 8 is pressed by the bead 8a into the groove 5c, so that it cannot be pressed out of the groove 5c when the coupling sleeve 7 comes into contact with the bead 8b.

Figure 5:
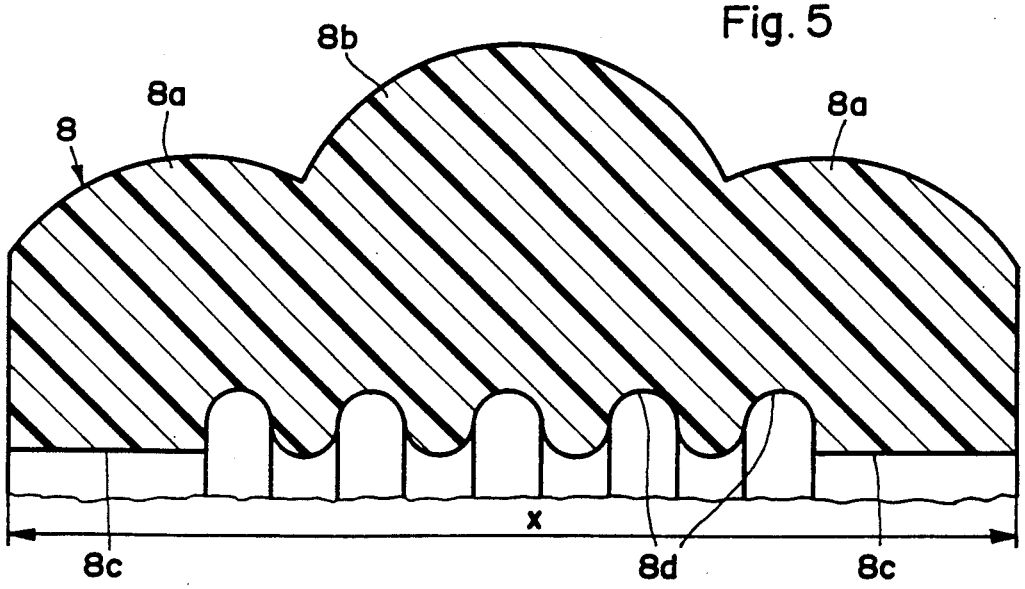
FIG. 5 is an enlarged axial sectional view of the sealing ring according to FIGS. 3 and 4 before insertion.

As is apparent from FIG. 4, the pipeline formed from the coupled pipes 4 has constant external diameter all over its length, i.e., even in the coupling area. This is achieved by the coupling sleeve 7 being sunk in the recess 5a of one pipe end part flush with the external diameter of the pipe and by corresponding recess 5b containing the groove 5c in the other pipe end part 4b, on the other hand. However, as is apparent from FIG. 5, the process described here is also suitable for producing a pipe coupling in which the coupling sleeve 7 is not sunk in a recess of the pipe end part 4a as shown in FIG. 4, but is applied directly to the pipe end part. Analogously, it is also sufficient to prepare only the recess forming the holding groove 5c for the sealing ring 8 in the other pipe end part 4b by the use of an appropriate insert ring.

Figure 6:
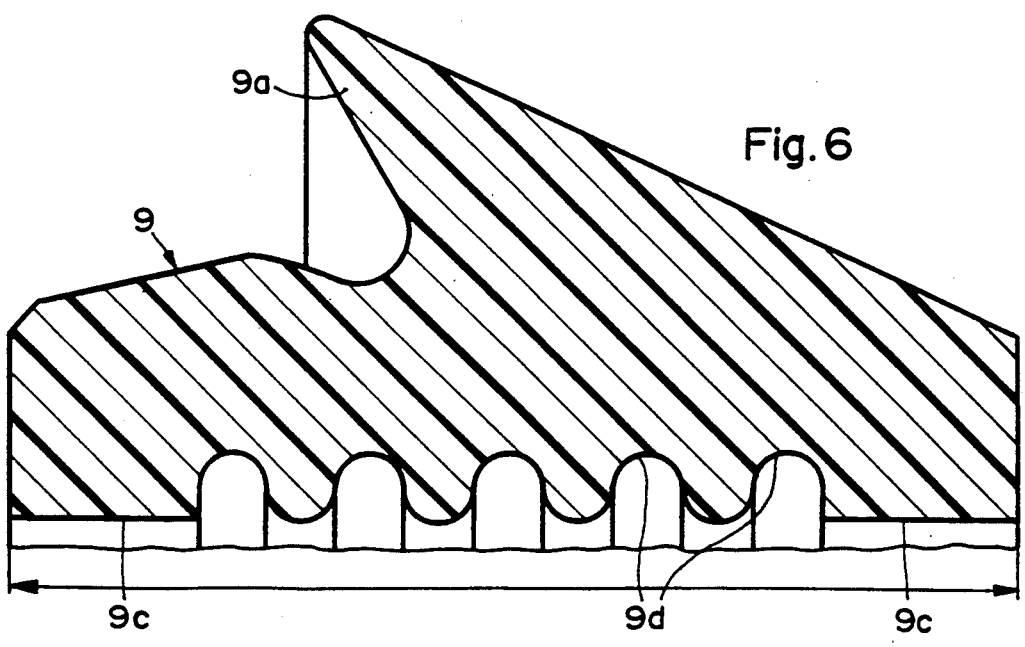
FIG. 6 is a sectional view of a variant of the sealing ring shown in FIG. 5.

As was mentioned, the sealing ring 8 shown in FIG. 6 is used in the coupling of pipes of a nonpressurized pipeline. However, if the coupling must withstand external pressures, e.g., hydrostatic pressures in the case of plastic pipes used as internal liners for a reinforced concrete or concrete pipeline, a lip seal 9 (FIG. 6) placed into the groove 5c with, e.g., 10% prestress is preferably used. However, the top edges of the end faces of the sealing ring 9 are flush with the corresponding top edge of the front walls of the groove 5c in this case as well, and the top side of the sealing ring 9 is designed as a sealing lip 9a directed toward the open side of the coupling sleeve 7. In contrast, the inner side of the sealing ring 9 corresponds exactly to that of the sealing ring 8, i.e., it has annular flutes 9a between the cylindrical annular surfaces 9c, and, in addition to the axial clearance of the ring 9 in the groove 5c, the annular flutes 9d create space for the oversize which the sealing ring has an insertion, and for the material of the sealing ring which is displaced during the coupling of the pipes.

While specific embodiments of the invention have been shown and described in detail to illustrate the application of the principles of the invention, it will be understood that the invention may be embodied otherwise without departing from such principles.

What is claimed is:

1. A glass fiber-reinforced filler-containing pipe, arrangement comprising: a glass fiber-reinforced filler-containing pipe formed by centrifugal casting in a rotated mold to define a first end part having a recess shaped by a mold insert ring and a second end part having a recess shaped during centrifugal casting by a mold insert ring each recess having a finished glass fiber reinforced surface, a coupling sleeve extending axially beyond the first end part formed as a laminate adhering to the first end part, a sealing ring received by the second end part recess, in a coupling position, coupling a first end of one pipe with second end of another pipe, the sealing ring being overlapped by the coupling sleeve.

2. An arrangement according to claim 1, wherein the recess of the second end part includes annular groove of rectangular cross section for receiving the sealing ring, the sealing ring being inserted in the annular groove in a radially prestressed state.

3. An arrangement according to claim 2, wherein the sealing ring includes a plurality of annular flutes on an inner surface of the sealing ring, the annular flutes being positioned in contact with a peripheral surface of the groove between two cylindrical end faces of the sealing ring.

4. An arrangement according to claim 3, wherein the sealing ring includes annular beads which project radially over an external peripheral surface of the second end part.

5. An arrangement according to claim 1, wherein each end part's recess is formed as a cylindrical recess of equal depth, the coupling sleeve being inserted flush with the outer peripheral surface of the recess of the first end part, the recess of the second end part including an annular groove for receiving the sealing ring.

6. A coupling for glass fiber-reinforced filler-containing pipes, formed by the steps of: forming pipes with end parts having recesses by inserting rings of soft PVC into a pipe mold and forming a pipe by centrifugal casting including rotating the mold to cause a finished glass fiber reinforced surfaced on each recess; and, subsequently removing the formed pipe from the mold and forming a coupling sleeve on one end of the pipe by connecting the one end of the pipe with a cylindrical mold insert and wrapping the pipe end and the cylindrical mold insert with a fabric or mat impregnated with a photo-curing polyester resin.

* * * * *